Feb. 19, 1946.  E. C. TAYLOR  2,395,152
ELECTRICALLY HEATED BLANKET
Filed April 15, 1944  2 Sheets-Sheet 1

INVENTOR
EDWARD C. TAYLOR
BY Chapin & Neal
ATTORNEYS

Feb. 19, 1946.  E. C. TAYLOR  2,395,152
ELECTRICALLY HEATED BLANKET
Filed April 15, 1944  2 Sheets-Sheet 2

INVENTOR
EDWARD C. TAYLOR
BY Chapin & Neal
ATTORNEYS

Patented Feb. 19, 1946

2,395,152

UNITED STATES PATENT OFFICE 2,395,152

ELECTRICALLY HEATED BLANKET

Edward C. Taylor, Longmeadow, Mass., assignor to William Bradford, Taunton, Mass.

Application April 15, 1944, Serial No. 531,144

2 Claims. (Cl. 219—46)

This invention relates to the automatic control of electrical blankets. An electrical blanket presents a problem of control quite different from that present in the use of the ordinary heating pad. A heating pad is intended to create a feeling of heat or distinct warmth, and its controls are such as to maintain it at the constant temperature desired. An electric blanket, on the other hand, is intended merely to supply a sufficient amount of heat to make up for that lost from the patient's body to the surrounding air. Its energy input should be regulated so that this heat loss should just be compensated for, and since this loss varies with the ambient temperature it is necessary that the regulating means should primarily respond to the room temperature rather than that of the blanket. It has hitherto been proposed to supply electric current to the blanket heating coil in pulses, the frequency and duration of which were controlled by the room temperature while the maximum temperature which the blanket attained during periods of energization remained constant.

It is the object of the present invention to so regulate the blanket that the maximum temperature permitted to the blanket is caused by an external control to vary inversely with room temperature, a subsidiary regulation occurring within the blanket itself to maintain the pad at the selected temperature. To secure definite graduations in blanket temperature it is preferred to utilize the heating circuit described in my prior Patent 2,237,852, Apr. 8, 1941, which in commercial practice has proved to maintain pad temperatures closely within the selected ranges, and to supplement this control with an external thermostatically controlled switching mechanism responsive to room temperature. By this arrangement the blanket will attain a higher temperature the lower the temperature of the ambient air, thus compensating for the increased heat loss occurring during lower room temperature conditions and avoiding the wide swings in blanket temperature inherent in former controls.

The invention will now be described with relation to the accompanying drawings, in which Fig. 1 is a diagrammatic view of a blanket having the circuit of my prior Patent 2,237,852 and controlled in accordance with the present invention;

Figure 1:
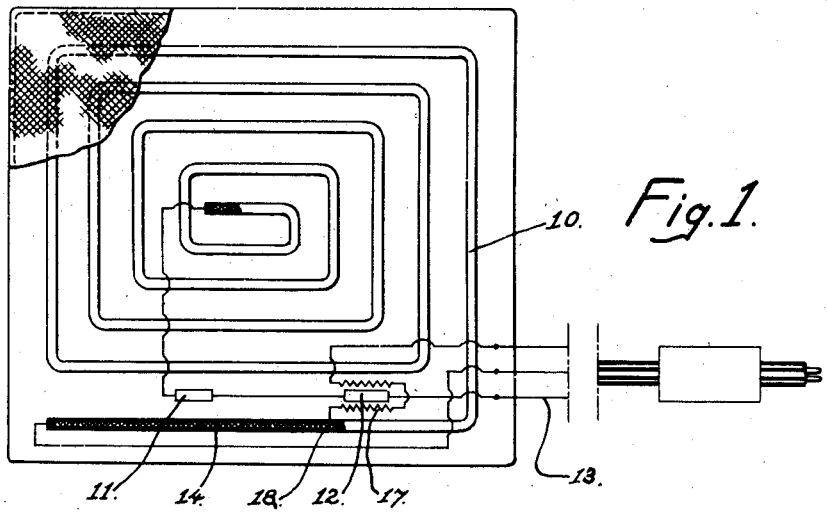
Figure 2:
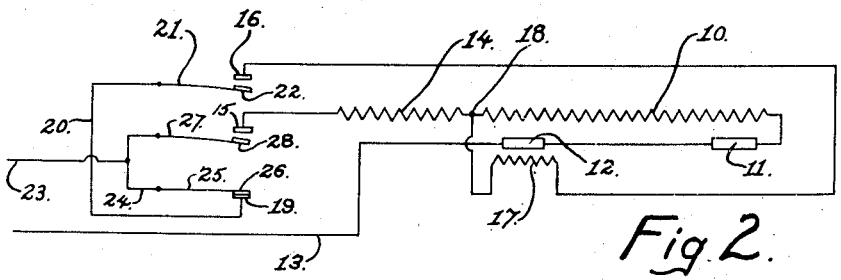
Fig. 2 is a circuit diagram showing one form of control in the condition at high room temperatures when no energy is being supplied to the blanket.

Referring first to Figs. 1 and 2, the main blanket heating resistance coil is shown at 10. One end of this coil is connected through a safety thermostat 11 to a blanket control thermostat 12 and thence through a wire 13 to one side of the power line. The coil 10 is formed with an extension 14, with which it is usually formed in practice as a continuous winding, the extension forming what may be termed a ballast resistance and being connected to a switch point 15. A second switch point 16 is connected, through a thermostat heating coil 17, with the junction point 18 between the heating coil 10 and its extension 14. A third switch point 19 is connected by a wire 20 with a bimetallic element 21 having a contact 22 which in the open circuit condition of Fig. 2 is separated from switch point 16. The second side 23 of the power line branches, one side 24 connecting with a bimetallic element 25 having a contact 26 mating with the switch point 19. The second branch is connected to a bimetallic element 27 having a contact 28 positioned to contact with the switch point 15.

Figure 3:
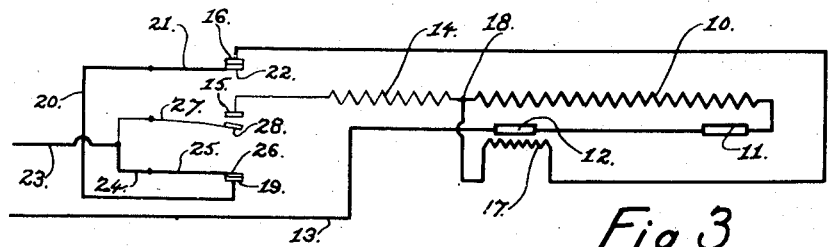
Figs. 3, 4 and 5 are similar views showing the effect of progressively lower room temperatures.
Figure 4:
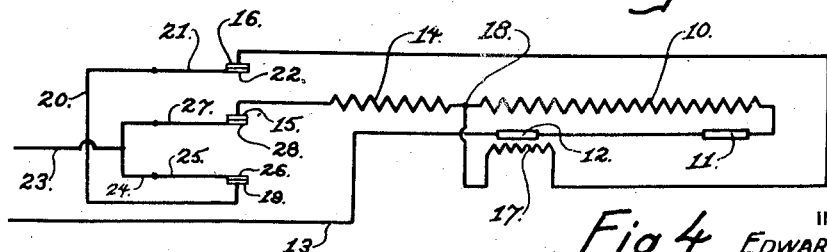
Figure 5:
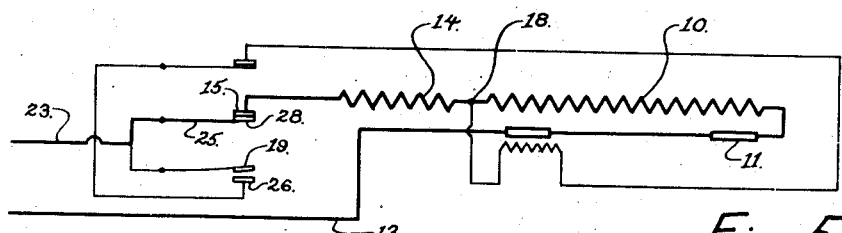

The several bimetallic elements are so bent or tensioned that they will perform their functions successively as the room temperature drops. With normal room temperatures the contact 19, 26 is closed, while the other two are open as shown in Fig. 2, preventing current from flowing through the mains to the point required to close contact 16, 22 a circuit condition results as shown in Fig. 3, in which heavy lines indicate the active part of the circuit. The entire current reaching the heating element 10 passes through the auxiliary thermostat heater 17 making the latter hotter than the blanket is at a relatively low heat. If the room temperature drops further the contacts 15, 28 also close, forming an alternative path to the junction point 18 as shown in Fig. 4 and reducing the current through the auxiliary thermostat heater 17. An intermediate temperature of the blanket results, since while the thermostat 12 will still be at a higher temperature than the blanket the differential will not be as great as in Fig. 3. With a still lower room temperature the contacts 19, 26 will open, resulting in the circuit condition shown in Fig. 5. Here no current flows through the auxiliary thermostat heater 17, and the thermostats 11 and 12 respond to the temperature of the blanket only, resulting in the highest temperature of which the blanket is capable. The temperature of the blanket thus varies inversely with the temperature of the room, compensating directly for the increased loss of heat of the patient by radiation as the room temperature drops.

Figure 6:
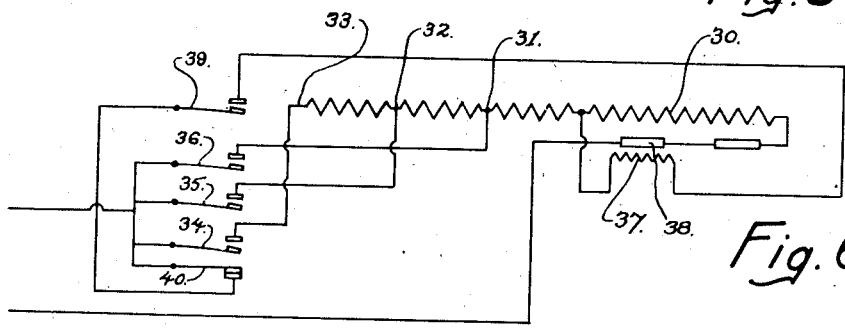
Fig. 6 is a circuit diagram showing a modification producing more graduations in the operating temperature of the blanket.

The same principle can be carried further if the complication of added thermostats and connecting wires is permissible, as shown in Fig. 6. Here the main blanket heating coil 30 is provided with an extension with taps at 31, 32, and 33 controlled by successively acting thermostats 34, 35 and 36 respectively. The current through the auxiliary heater 37 for the blanket control thermostat 38 will thus be successively varied in the same manner as before but in a greater number of steps. The bimetallic element 39 which initiates the heating of the blanket and the element 40 which causes the blanket to attain its maximum heat operate as in the previous case.

Figure 7:
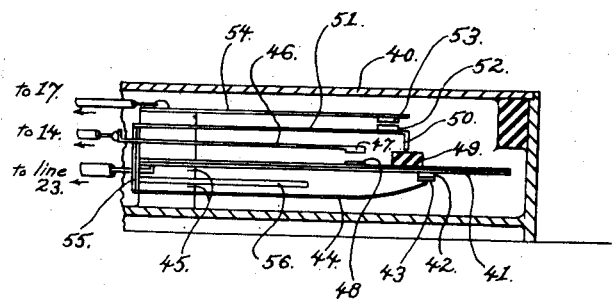
Fig. 7 is a sectional view of one form of thermostatic switch usable in the circuit of Figs. 2 to 5.

In previous modifications the successively decreasing currents through the auxiliary thermostat heating element are determined by successively acting bimetallic elements. It is not necessary to provide this number of bimetallic elements if a suitable switch arrangement is used. In Fig. 7 a switch is shown involving the use of a single bimetallic element which will perform all the functions of the plural bimetallic elements in Figs. 2 to 5. In a casing 40, open to the air of the room, is a bimetallic element 41. On its underside the element 41 bears a contact block 42 normally engaging a block 43 on a conducting spring 44. The bimetallic element 41, the spring 44, and other springs to be referred to, are mounted between insulating blocks 45 suitably held as by screws (not shown) within the casing 40. The contact made by blocks 42, 43 corresponds to the one marked 19, 26 in Fig. 1.

On the opposite side of the bimetallic element is a spring 46, at the end of which is a contact 47 mating with a contact 48 on the element 41. This pair of contacts corresponds to the pair 15, 28 in Fig. 2. An insulating block 49 on the element 41 is positioned to strike the end 50 of a third spring 51 positioned with a contact 52 adjacent a contact 53 on a fourth spring 54. The latter pair of contacts corresponds to the pair 16, 22 in Fig. 2. The bimetallic element is connected to the line 23, spring 46 to the extension 14, and spring 54 to the blanket control thermostat 17. Springs 44 and 51 are connected by a jumper 55. The proportions of the parts is such that as the right end of the bimetallic element rises due to a drop in room temperature the contacts 52, 53 will close first, contacts 42, 43 remaining closed. The blanket circuit is as in Fig. 3. If the room temperature drops further contacts 47, 48 will close, contacts 42, 43 still remaining closed. The blanket circuit is then as in Fig. 4. On a further drop in room temperature the spring 44 strikes an insulating abutment 56 so that contacts 42, 43 open, preventing flow of current through springs 51, 54 even though contacts 52, 53 remain closed. This results in the circuit condition shown in Fig. 5.

Figure 8:
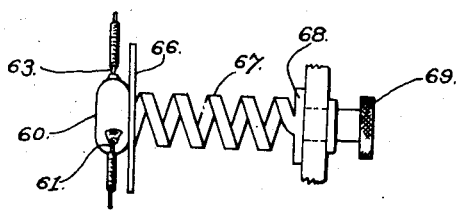
Fig. 8 is a side view and Fig. 9 an end view of an alternative form of thermostatic switch.
Figure 9:
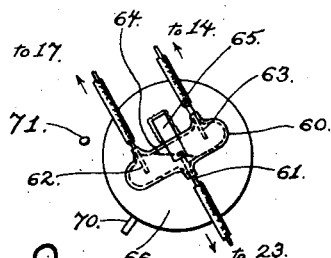

Figs. 8 and 9 show a further type of thermostat responsive to room temperature in which a special mercury switch is employed. This switch is encased in an exhausted glass vessel 60 having a central bottom electrode 61 and two top end electrodes 62, 63. The mercury level is indicated at 64. The vessel 60 is held in a clip 65 on a plate 66 which is mounted on one end of a helically wound bimetallic element 67 secured at the other end to a rotatable plate 68. This plate can be turned as by a thumb nut 69 to adjust the room temperature at which current is first turned onto the blanket. Before the room temperature has dropped to this predetermined point the plate 66 is in a position turned counter-clockwise from that shown in Fig. 9, the mercury being confined to the left hand end of the vessel 60 so that it contacts electrode 62 but not 61. No current flow is thus possible. Decreasing room temperature causes plate 66 to turn clockwise as viewed in Fig. 9, the first increment of rotation bringing the plate to the position there shown, in which the mercury bridges the electrodes 61 and 62. Electrode 61 is connected to the line 23 (Fig. 1) and electrode 62 to the auxiliary thermostat heater 17 in the same manner as the contact 16. A circuit condition thus results corresponding to that shown in Fig. 3. Further rotation causes contact of the mercury with all three electrodes and, since the electrode 63 is connected to the heater extension 14 in the same manner as the contact 15 of Fig. 1, the same circuit condition will result as in Fig. 4. Still further rotation will break the mercury contact between electrodes 61 and 62 but will leave that between 61 and 63. This results in the circuit condition of Fig. 5. To prevent the plate 66 turning so far as to break the latter contact the plate may be provided with a lug 70 adapted to strike a stop 71 mounted on some part of the casing in which the thermostat is mounted.

I claim:

1. An electrically heated blanket having a heating coil having one end connected to one side of the power line through a control thermostat, a thermostat heating coil connected to the second end of the heating coil, a ballast resistance connected to the second end of the heating coil, a thermostat external to the blanket and responsive to room temperature, and switch means operable by the thermostat with decreasing room temperature to connect the second side of the power line successively to the free end of the thermostat heating coil, to the free ends of the thermostat heating coil and the ballast resistance in parallel, and to the free end of the ballast resistance.

2. An electrically heated blanket having a main heating coil having one end connected to one side of the power line through a control thermostat, a thermostat heating coil connected at one end to the second end of the main heating coil, a ballast resistance connected at one end to the second end of the heating coil, a mercury switch external to the blanket and provided with a central electrode connected to the second side of the line and end electrodes connected respectively to the second end of the thermostat heating coil and to the second end of the ballast resistance, and thermostatic means responsive to room temperature and connected to rotate the mercury switch in a direction to cause, with progressively decreasing room temperature, the mercury to connect the central electrode with the first end electrode, the central electrode with both end electrodes, and the central electrode with the second end electrode.

EDWARD C. TAYLOR.